United States Patent [19]
Kokubo et al.

[11] Patent Number: 5,718,503
[45] Date of Patent: Feb. 17, 1998

[54] ILLUMINATION APPARATUS

[75] Inventors: Masahiko Kokubo; Kenji Ueyama; Kenji Endo, all of Kyoto, Japan

[73] Assignee: Dainippon Screen Manufacturing Co., Ltd., Kyoto, Japan

[21] Appl. No.: 462,828

[22] Filed: Jun. 5, 1995

[30] Foreign Application Priority Data

Jul. 8, 1994 [JP] Japan .................................. 6-157026
Dec. 26, 1994 [JP] Japan .................................. 6-323208

[51] Int. Cl.$^6$ ..................................................... F21V 7/00
[52] U.S. Cl. ..................... 362/307; 362/268; 362/269
[58] Field of Search ........................ 362/33, 97, 268,
362/269, 282, 285, 287, 307, 331, 347,
350, 427; 355/67

[56] References Cited

U.S. PATENT DOCUMENTS

| 1,124,051 | 1/1915 | Matisse | 362/287 |
| 3,375,362 | 3/1968 | Klippert | 362/33 |

FOREIGN PATENT DOCUMENTS

| 299475 | 1/1989 | European Pat. Off. . |
| 376398 | 7/1990 | European Pat. Off. . |
| 2537547 | 8/1995 | Germany . |
| 2-226606 | 9/1990 | Japan . |
| 2-289834 | 11/1990 | Japan . |
| 6-332044 | 12/1994 | Japan . |
| 1204222 | 9/1970 | United Kingdom . |

OTHER PUBLICATIONS

*Soviet Inventions Illustrated*, PQ Section, Week 8422, Sep. 7, 1983, Derwent Publications Ltd., London & SU–A–1039 886.

*Patent Abstracts of Japan*, vol. 15, no. 67, Feb. 18, 1991; p. 30 P1167; & JP A 02 289 834.

*Primary Examiner*—Y My Quach
*Attorney, Agent, or Firm*—Ostrolenk, Faber, Gerb & Soffen, LLP

[57] ABSTRACT

An illumination apparatus is disclosed which efficiently irradiates an irradiation surface without destroying the symmetry of an illuminance distribution at the irradiation surface. A light source is displaced from a center of curvature of a spherical mirror in a direction in a displacement plane which includes an axis of symmetry of the spherical mirror so as to form a light source image at a position off the light source. Due to this, a ray from the spherical mirror passes off the light source (i.e., the position of the light source image), and therefore, a reflection ray is not shielded, absorbed nor otherwise disturbed by the light source, which in turn prevents deterioration in the efficiency of utilization of light. Further, the light source, the spherical minor and the lens are assembled into a light source unit which is inclined at an angle about a principal point of the lens with respect to a central axis of the irradiation surface and displaced a certain distance in a displacement direction which is perpendicular to the central axis. Hence, the illuminance distribution at the irradiation surface is adjusted and the symmetry of the illuminance distribution at the irradiation surface is improved.

10 Claims, 17 Drawing Sheets

SA (OA)

SA (OA)

ILLUMINATION APPARATUS

BACKGROUND OF THE INVENTION

1. Field of the Invention

The present invention relates to an illumination apparatus applicable to a contact type printer for plate making, a proximity exposure apparatus for manufacturing a liquid crystal display, etc.

2. Description of the Background Art

Japanese Patent Laid-Open Gazette No. 2-289834 discloses a conventional illumination apparatus of this type. FIG. 15 is a schematic cross sectional view of the disclosed illumination apparatus. To irradiate an irradiation surface 2, the conventional illumination apparatus comprises a light source 4, a spherical mirror 6 and a condenser lens 8. In the illumination apparatus, a ray emitted at a front half surface of the light source 4 facing the irradiation surface 2 passes through the condenser lens 8 and illuminates upon the irradiation surface 2. On the other hand, since the light source 4 is located at the center of curvature of the spherical mirror 6, a ray emitted at a rear half surface of the light source 4 facing the spherical mirror 6 is reflected by the spherical mirror 6 and goes back to the light source 4. The reflected ray passes through the light source 4 and enters the condenser lens 8 to be irradiated upon the irradiation surface 2. In this manner, the spherical mirror 6 functions to efficiently guide rays from the light source 4 onto the irradiation surface 2 and effectively illuminate the irradiation surface 2.

However, the location of the light source 4 at the center of curvature of the spherical mirror 6 creates the following problems.

First, since a ray reflected by the spherical mirror 6 returns to and passes through the light source 4, a light emitting part of the light source 4 blocks, absorbs or scatters the reflected light, which reduces efficiency.

Further, although the light source 4 needs to be replaced with a new light source when its life terminates, since light sources are not precisely the same even though constructed to be identical and therefore the light emitting part of the new light source 4 could be displaced from the previous position after replacement, the position at which a returning ray from the spherical mirror 6 passes through the new light source 4 could be different from the previous position after replacement. This changes the luminous intensity distribution of a light source image and changes an illumination state at the irradiation surface 2. As indicated by the name, "luminous intensity distribution" is a distribution of how the luminous intensity of a light source or a light source image is distributed in various directions.

Still further, the temperature of the light emitting part increases more in the illumination apparatus described above than in an illumination apparatus which does not include the spherical mirror 6. This results in a shortened life of the light source 4 or even explosion of the light source 4, although the luminance at the light emitting part is improved.

A conventional solution to these problems is to displace the light source 4 from the center of curvature of the spherical mirror 6 as disclosed in Japanese Patent Laid-Open Gazette No. 2-226606, for example. In FIG. 16, the light source 4 is displaced from the center of curvature 6a of the spherical mirror 6 in a direction X which is perpendicular to an optical axis OA to form a light source image 10 of the light source 4 at a position symmetrical to the optical axis OA. As a result, a ray reflected by the spherical mirror 6 is prevented from passing through the light source 4, thereby solving the problems above.

However, the illumination apparatus of FIG. 16 creates another problem. That is, the symmetry of the luminous intensity distribution of the light source image 10 is largely destroyed in a displacement plane in which the position of the light source 4 was displaced (i.e., the plane of FIG. 16). Consequently, the illuminance distribution at the irradiation surface 2 becomes asymmetrical with respect to a central axis CA of the irradiation surface 2. In the apparatus of FIG. 16, particularly, the central axis CA coincides with the optical axis OA.

The cause of this problem is as follows. FIGS. 17 and 18 are to be referred to. For instance, if the light source 4 is displaced a distance dx from the center of curvature 6a of the spherical mirror 6 in the direction X which is perpendicular to the optical axis OA as shown in FIG. 17, a ray emitted from the light source image 10 at an angle $\phi$ satisfies the following relations:

$$R^2 = (dx)^2 + R2^2 - 2(dx)R2\cos(90° - \phi)$$
$$R1^2 = (2dx)^2 + R2^2 - 2(2dx)R2\cos(90° - \phi)$$

Eq. 1

$$\text{(Luminous intensity distribution)} = \left(\frac{R2}{R1}\right)^2$$

where R1 is a distance between the light source 4 and the spherical mirror 6 which has a radius of curvature R, and R2 is a distance between the spherical mirror 6 and the light source image 10.

Suppose that the radius of curvature R is 150 mm and the displacement dx is 15 mm, as shown in FIG. 18A, the symmetry of the luminous intensity distribution of the light source image 10 toward the irradiation surface 2 is largely destroyed in the displacement plane (i.e., the plane of FIG. 18A). Hence, although the symmetry of the luminous intensity distribution of the light source 4 toward the irradiation surface 2 is excellent (FIG. 18B), at the irradiation surface 2 where the two luminous intensity distributions overlap with each other, the illuminance distribution becomes asymmetrical with respect to the central axis CA.

Asymmetric luminous intensity distribution at the irradiation surface 2 and deteriorated illumination efficiency are not the only problem in the conventional illumination apparatus of FIGS. 15 and 16. In the conventional illumination apparatus, since a ray into the condenser lens 8 is reflected multiple times, or multiply reflected at an optical plane, not only a regular ray (which is created where there is no multiple reflection) but a multiple reflection ray as well are allowed from the condenser lens 8 onto the irradiation surface 2. Multiple reflection rays may concentrate locally at the irradiation surface 2, creating an uneven illuminance distribution. Hence, if such an illumination apparatus creating multiple reflection rays is used in a contact-type printer for plate making, the density distribution of halftone dots becomes uneven. If such an illumination apparatus creating multiple reflection rays is used in a proximity exposure apparatus for manufacturing a liquid crystal display, the luminance distribution at a liquid crystal display plate becomes uneven.

SUMMARY OF THE INVENTION

The present invention is directed to an illumination apparatus for illuminating an irradiation surface which has a central axis. The apparatus comprises: a light source having front and rear half portions, the light source emitting rays from the front and rear half portions; a spherical mirror disposed to face the rear half portion of the light source for reflecting the rays from the rear half portion, the spherical mirror having an axis of symmetry and a center of curvature; and optical means disposed to face the front half portion of the light source for directing the rays from the front half portion and the reflected rays from the spherical mirror to the irradiation surface, wherein the light source is displaced from the center of curvature of the spherical mirror in a displacement plane in which the axis of symmetry of the spherical mirror is located, and wherein the optical means is inclined at an angle with respect to the central axis of the irradiation surface in the displacement plane.

In a preferred embodiment, the light source comprises a light emitting means for emitting rays and a cylindrical or spherical glass container for enclosing the light emitting means, and wherein the light source is displaced from the center of curvature of the spherical mirror by a distance larger than half the radius of the glass container.

Preferably, the light source, the spherical mirror and the optical means are displaced as one unit from the central axis of the irradiation surface in the displacement plane.

Preferably, the light source, the spherical mirror and the optical means are inclined as one unit at an angle with respect to the central axis of the irradiation surface.

The optical means may comprise a lens system and reflection control means for controlling reflection of the rays in the lens system.

The reflection control means may comprise an anti-reflection means.

In another preferred embodiment, the lens system comprises a Fresnel lens having a Fresnel surface and a flat surface, the flat surface being directed toward the light source; a first transparent plate disposed on the light source side of the Fresnel lens; and a second transparent plate disposed on the irradiation surface side of the Fresnel lens, and wherein the first transparent plate and the Fresnel lens are in optical tight contact to each other.

The reflection control means may comprise an optically diffuse means.

According to the first aspect of the present invention, the optical means is disposed to face the front half portion of the light source while the spherical mirror is disposed to face the rear half portion of the light source, and the light source is displaced from the center of curvature of the spherical mirror in the displacement plane which includes the axis of symmetry of the spherical mirror. Hence, of rays emitted from the light source, those emitted at the rear half portion of the light source facing the spherical mirror are reflected by the spherical mirror to form the light source image at a position off the light source. Thus, rays from the spherical mirror pass off the light source (i.e., the position of the light source image), and therefore, reflected rays are not shielded, absorbed, scattered nor otherwise disturbed by the light source, which in turn prevents deterioration in the efficiency of utilization of light. Further, since the optical means is inclined at an angle with respect to the central axis of the irradiation surface in the displacement plane, the illuminance distribution at the irradiation surface is adjusted to be approximately symmetrical with respect to the central axis of the irradiation surface.

According to the second aspect of the present invention, the light source comprises the light emitting means for emitting rays and the cylindrical or spherical glass container for enclosing the light emitting means, and the light source is displaced from the center of curvature of the spherical mirror by a distance larger than half the radius of the glass container. Hence, the light source and the light source do not overlap each other, whereby an effective use of light is possible.

According to the third aspect of the present invention, the light source, the spherical mirror and the optical means are displaced as one unit from the central axis of the irradiation surface in the displacement plane. Hence, the illuminance distribution at the irradiation surface is further adjusted and the symmetry of the illuminance distribution at the irradiation surface is further improved.

According to the fourth aspect of the present invention, the light source, the spherical mirror and the optical means are disposed as one unit at an angle with respect to the central axis of the irradiation surface. Hence, the illuminance distribution at the irradiation surface is adjusted and the symmetry of the illuminance distribution at the irradiation surface is improved.

According to the fifth aspect of the present invention, the optical means comprises a lens system and reflection control means. Hence, reflection of rays propagating within the optical means is controlled with reflection control means.

According to the sixth aspect of the present invention, the reflection of the rays within the optical means is suppressed at the anti-reflection means of the reflection control means, which in turn suppresses creation of multiple reflection rays.

According to the seventh aspect of the present invention, the first transparent plate and the Fresnel lens are in optically tight contact to each other. The optically tight contact includes means for filling an adhesive or a liquid between the flat surface of the first transparent plate facing the Fresnel lens and the flat surface of the Fresnel lens facing the first transparent plate. When bonded in optically tight contact to each other, these flat surfaces do not function as reflection surfaces. Hence, creation of multiple reflection rays is suppressed.

According to the eighth aspect of the present invention, the optical means comprises an optically diffuse means. Hence, even if rays propagating within the optically means are reflected at the optical diffuse means, resulting reflection rays are diffused in a certain angular range. This prevents local concentration of multiple reflection rays at the irradiation surface, thereby improving the uniformity of the illuminance distribution at the irradiation surface.

Accordingly, it is an object of the present invention to provide an illumination apparatus which irradiates an irradiation surface efficiently without destroying symmetry of the illuminance distribution at the irradiation surface.

A further object of the present invention is to obtain an illumination apparatus which irradiates an irradiation surface while suppressing creation of a multiple reflection ray.

A still further object of the present invention is to obtain an illumination apparatus which reduces local concentration of multiple reflection rays and improves uniformity of an illuminance distribution at an irradiation surface.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
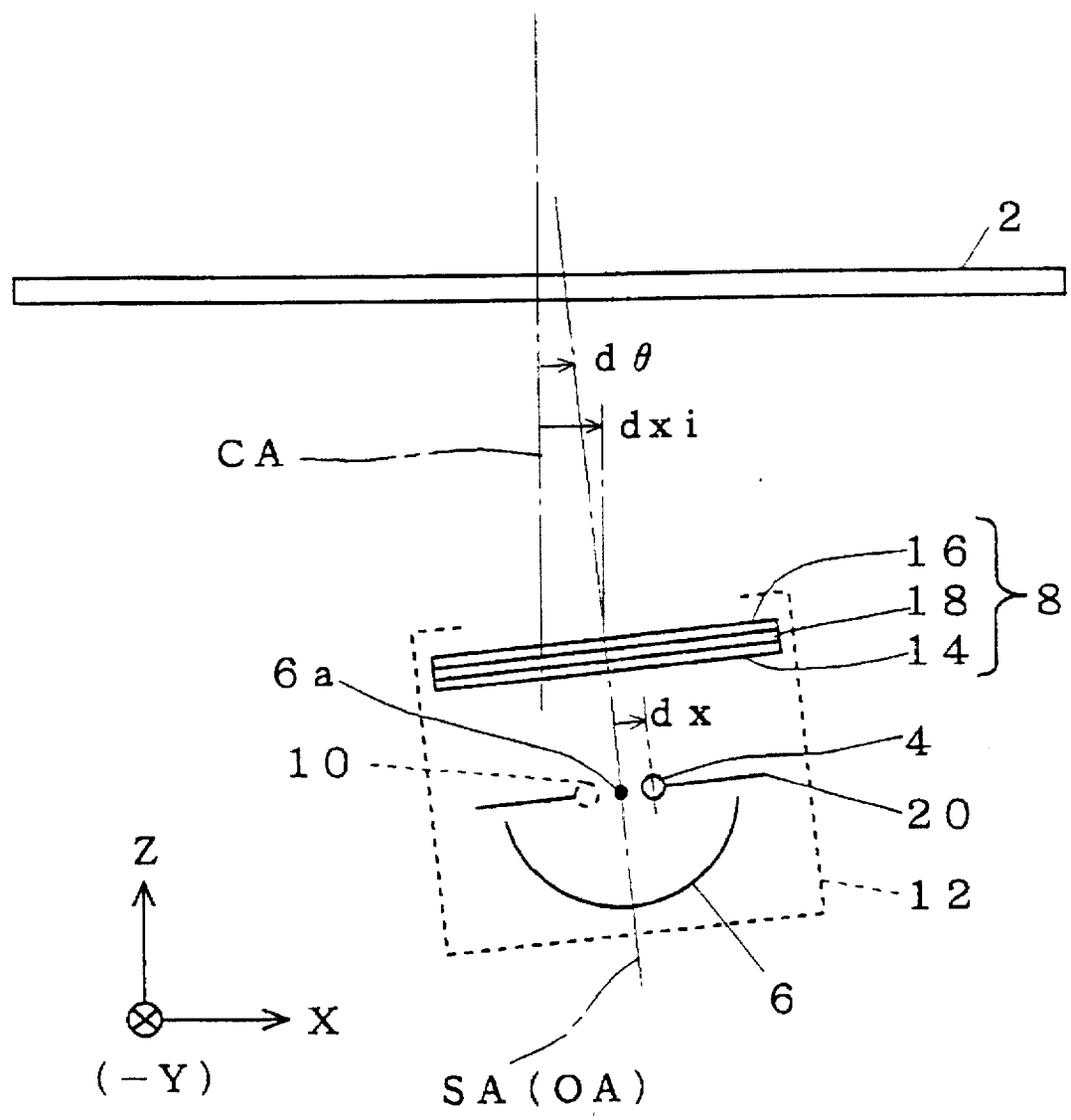
FIG. 1 is a view of an illumination apparatus according to a first preferred embodiment of the present invention.
Figure 16:
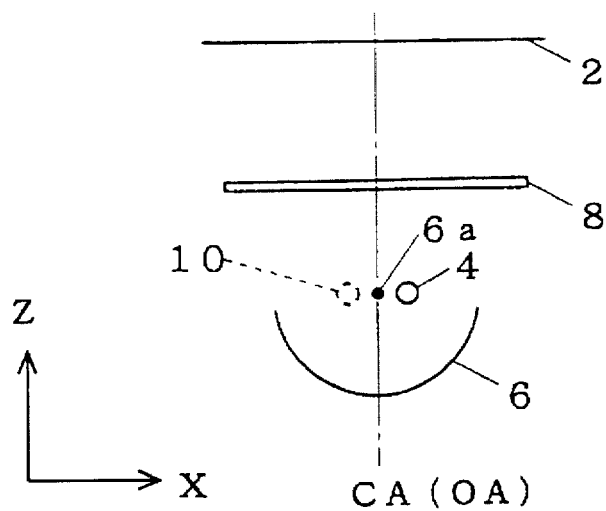
Figure 17:
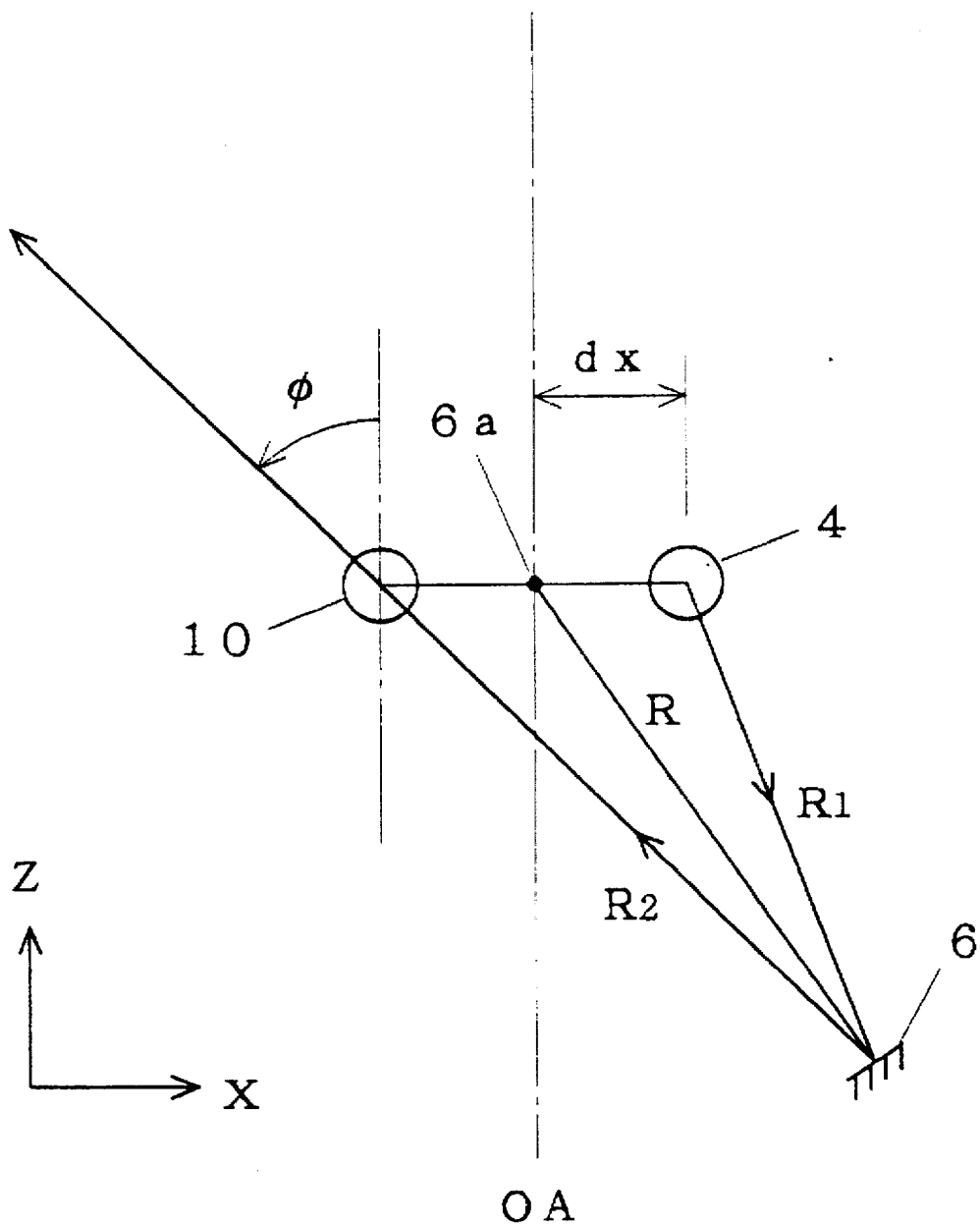
FIG. 17 is a schematic view showing a positional relationship between a light source, a light source image and a spherical mirror within the illumination apparatus of FIG. 16.

FIG. 1 is a view of an illumination apparatus according to a first preferred embodiment of the present invention. The illumination apparatus has two major differences from the conventional illumination apparatus of FIG. 16. First, a light source 4, a spherical mirror 6 and a lens 8 are assembled into one unit and this assembly (hereinafter "light source unit") 12 is inclined with respect to a central axis CA of an irradiation surface 2. Second, the light source unit 12 is displaced a certain distance dxi in a direction X which is perpendicular to the central axis CA (i.e., in "displacement direction"). The illumination apparatus of the first preferred embodiment is otherwise basically the same as the conventional illumination apparatus of FIG. 16.

Figure 2A:
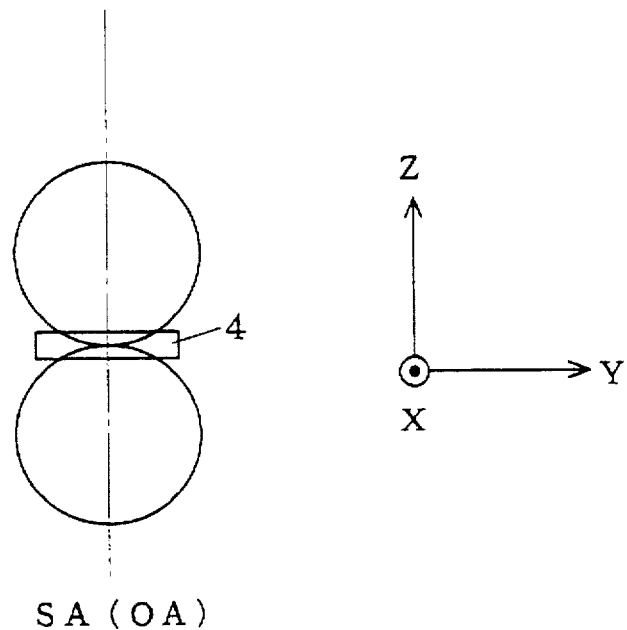
FIGS. 2A and 2B are views of a luminous intensity distribution characteristic of a light source.
Figure 2B:
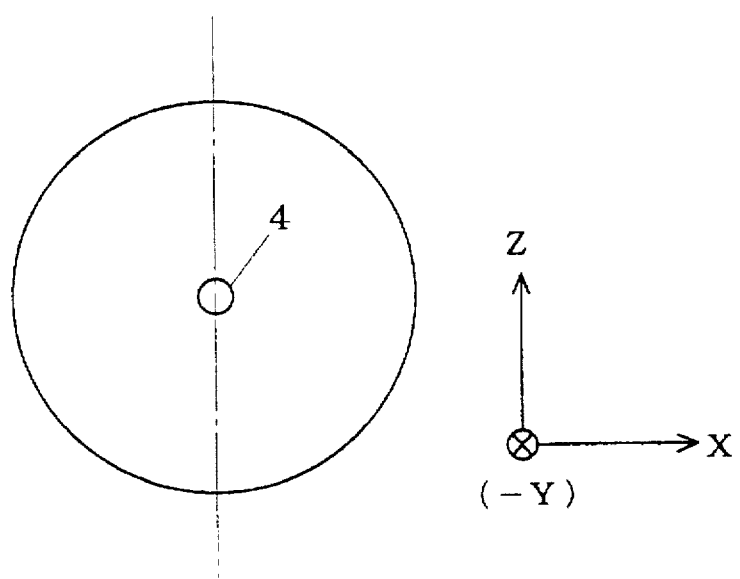

In the first preferred embodiment of the present invention, the light source 4 is a metal halide lamp which is manufactured by enclosing a light emitting part in a cylindrical glass container of a predetermined radius (e.g., radius r4a) (see FIG. 3) which elongates in a direction which is perpendicular to the displacement direction X (hereinafter "direction Y"). Constructed as such, the light source 4 possesses a luminous intensity distribution characteristic as that shown in FIGS. 2A and 2B.

The light source 4 is displaced from a center of curvature 6a of the spherical mirror 6 by a distance dx which is larger than half the radius r4a of the glass container as shown in FIG. 1. Hence, of rays emitted from the light source 4, a ray emitted at a rear half surface of the light source 4 facing the spherical mirror 6 is reflected by the spherical mirror 6 and focused as a light source image 10 at a position which is symmetrical with respect to an axis of symmetry SA of the spherical mirror 6. Since the light source image 10 is formed off the light source 4 and a ray from the spherical mirror 6 passes through a position off the light source 4 (that is, the position of the light source image 10), a reflection ray is not blocked, absorbed, scattered nor otherwise disturbed by the light emitting part of the light source 4, whereby an effective use of light is maintained. Although the first preferred embodiment requires that the light source 4 is displaced more than the distance dx to prevent the light source 4 from overlapping the light source image 10, it is possible to prevent positional coincidence of the light source image 10 and the light source 4 and hence to ensure an effective use of light, so long as the light source 4 is displaced off the center of curvature 6a of the spherical mirror 6.

Figure 3:
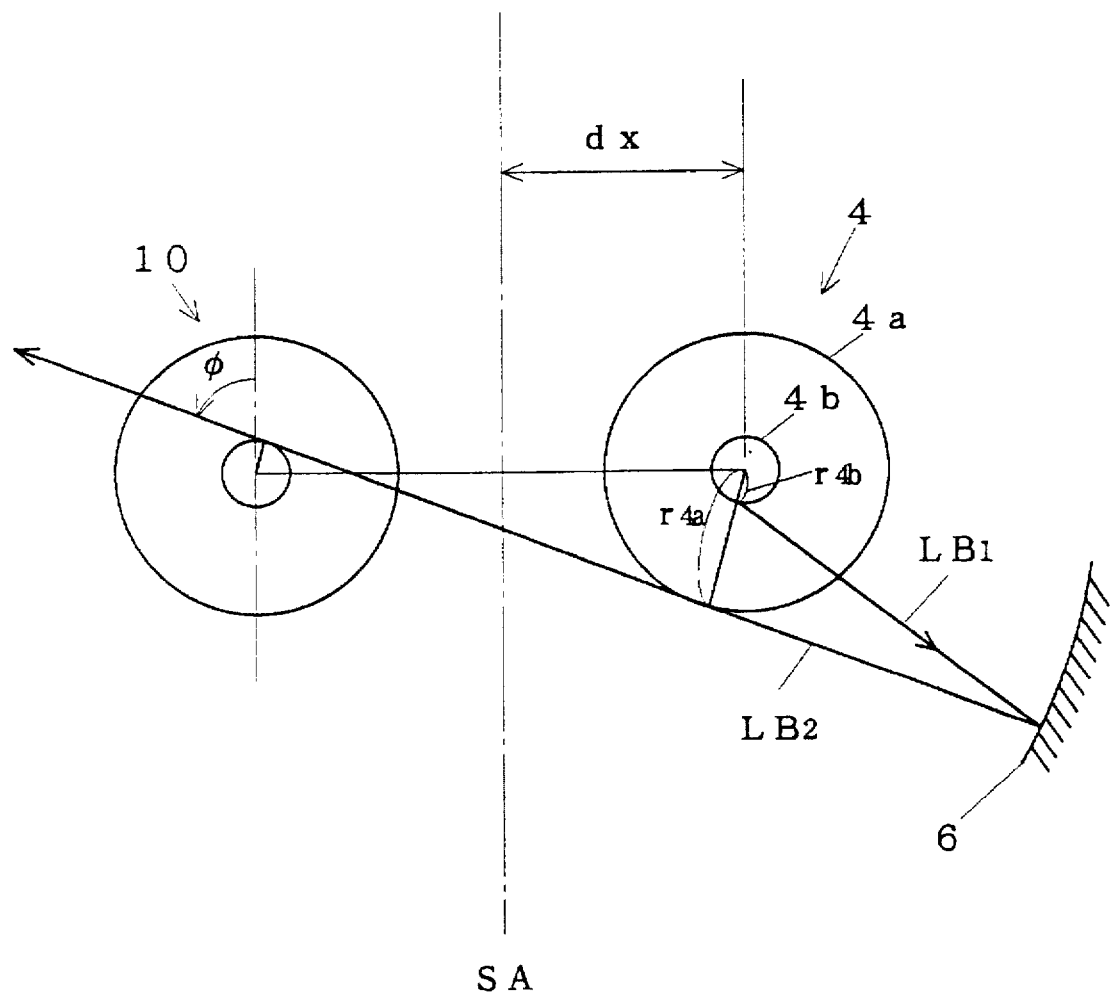
FIG. 3 is a schematic view showing a positional relationship between a light source and a light source image.

FIG. 3 is now referred to with respect to a description on an optimal displacement of the light source 4 for improving an effective use of light. FIG. 3 shows an optical path of a ray from a light emitting part 4b of the light source 4 reflected by the spherical mirror 6 and passing the light source 4 tangent to an exterior surface of a glass container 4a of the light source 4. When a ray propagates along such an optical path at an angle of φ or a smaller angle, the ray emitted at the rear half surface of the light emitting part 4b forms the light source image 10 without passing through the glass container 4a. Hence, no portion of the light is lost due to the existence of the glass container 4a, allowing a better use of the light. Although FIG. 3 shows the spherical mirror 6 as disposed close to the light source 4 for clarity of illustration, in general, the radius of curvature of the spherical minor 6 is sufficiently larger than the radius r4a of the glass container 4a.

Figure 4:
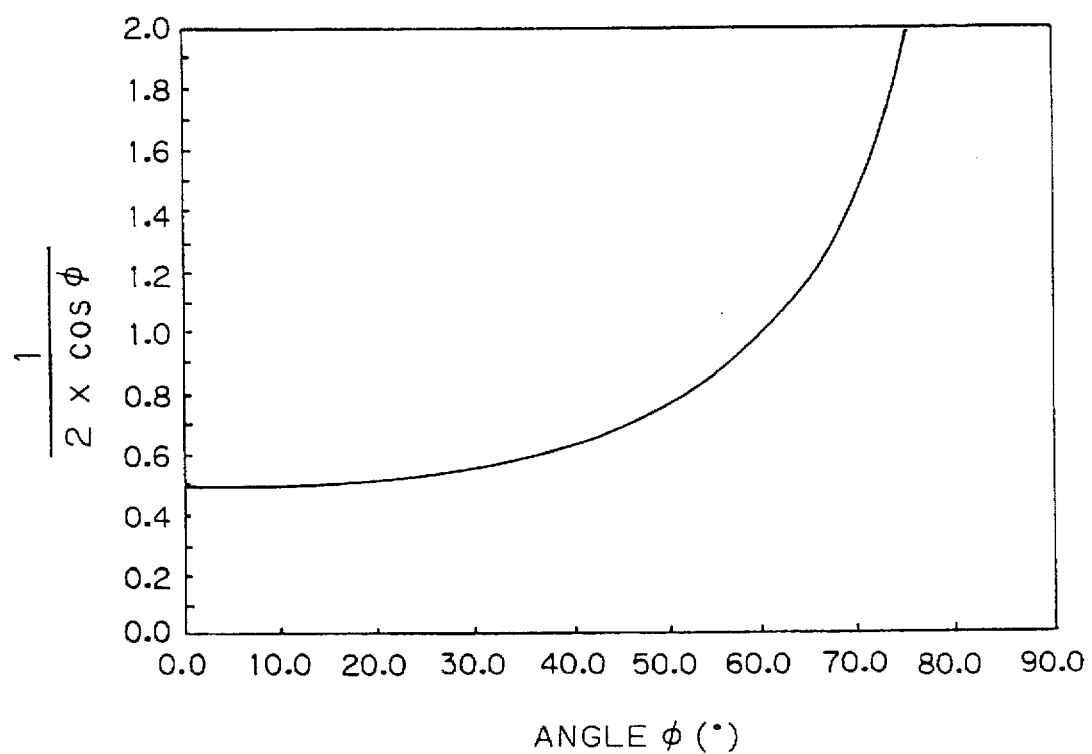
FIG. 4 is a graph of a proportional constant which is used to calculate a displacement from a converging angle of a ray.

When a ray propagates as shown in FIG. 3, the distance dx is expressed as:

$$dx = A(r4a + r4b) \qquad \text{Eq. 2}$$

$$A = \frac{1}{2\cos\phi}$$

where r4b is a radius of the light emitting part 4b and φ is an emergent angle from the light source image. The proportional constant A changes as shown in FIG. 4. Thus, once a divergent angle, i.e., the converging angle φ of rays from the light source 4 and the light source image 10 into the lens 8 is determined, light can be utilized efficiently by displacing the light source 4 from the center of curvature 6a of the spherical mirror 6 more than the distance dx which is expressed by Eq. 2 above.

Referring again to FIG. 1, the spherical mirror 6 is disposed on the opposite side of the irradiation surface 2, that is on a direction (−Z) side as viewed from the light source 4 so as to reflect a ray emitted at the rear half surface of the light source 4 facing the spherical mirror 6 and form the light source 10 at a position which is symmetrical with respect to the axis of symmetry SA of the spherical mirror 6. A light shielding plate 20 including a rectangle opening is disposed in an XY plane on which the light source image 10 and the light source 4 are located. The function of the light shielding plate 20 is to prevent an unnecessary ray such as a ray reflected by the irradiation surface 2 or the lens 8 and returning to the spherical mirror 6 from impinging on the spherical mirror 6 again. Hence, the illuminance distribution at the irradiation surface 2 is maintained in an excellent symmetry.

The lens 8 is located between the light source 4 and the irradiation surface 2. The lens 8 is formed by two glass plates 14 and 16 and a Fresnel lens 18 which is disposed between the two glass plates 14 and 16.

Having such a construction as above, the illumination apparatus is able to adjust the illuminance distribution at the irradiation surface 2 by means of the displacement (dxi) and the incline (dθ) of the light source unit 12, and hence, to ensure an approximately symmetrical irradiation with respect to the central axis CA at the irradiation surface 2.

Although the embodiment described above requires the light source unit 12 not only to be inclined with respect to the central axis CA of the irradiation surface 2 but also to be displaced in the displacement direction X, a similar effect is obtained even when the light source unit 12 is only inclined at an angle.

Now, to discuss the effect of the illumination apparatus having such a construction as above (namely, the excellent symmetry of the illuminance distribution at the irradiation surface 2), four versions of a specific structure of the illumination apparatus will be described. The first version of structure (a) is where the light source unit 12 is not inclined nor displaced (the conventional art of FIG. 16). The second version of structure (b) is where the light source unit 12 is only displaced. The third version of structure (c) is where the light source unit 12 is only inclined at an angle. The fourth version of structure (d) is where the light source unit 12 is not only inclined but also displaced.

Table 1 shows the specific structure of the illumination apparatus. In the four versions, the irradiation surface 2 measures 1000 mm×800 mm and the displacement dx of the light source 4 is 15 mm.

TABLE 1

| i | ri (mm) | di (mm) | n 404.66 |
|---|---------|---------|----------|
| 0 | —       | −150.0  | light source |
| 1 | 150.0   | 150.0   | reflection surface |
| 2 | —       | 117.0   | light source image |
| 3 | ∞       | 3.0     | 1.533111 |
| 4 | ∞       | 0.0     |          |
| 5 | ∞       | 3.0     | 1.50615  |
| 6 | r6      | 0.0     | Fresnel surface |
| 7 | ∞       | 3.0     | 1.533111 |
| 8 | ∞       |         |          |

In Table 1, as to the symbol i in the left-most column: i=0 denotes the light source 4; i=1 denotes the reflection surface of the spherical mirror 6; i=2 denotes the light source image 10; and i=3–8 denote the surfaces of the glass plate 14, the surface of the Fresnel lens 18 and the surfaces of the glass plate 16 which form the lens 8 respectively. As to the symbol ri in the next column: r1 denotes the radius of curvature of the spherical mirror 6; and r3–r8 denote the radii of curvature of the surfaces of the glass plate 14, the surfaces of the Fresnel lens 18 and the surfaces of the glass plate 16 which form the lens 8. The symbol di in the further next column denotes a surface-to-surface distance between an i-th surface and an (i+1)-th surface on the optical axis OA. The symbol n404.66 in the right-most column denotes refractive indexes of the plate 14, the Fresnel lens 18 and the glass plate 16 with respect to light which has a wavelength of 404.66 nm.

Figure 5:
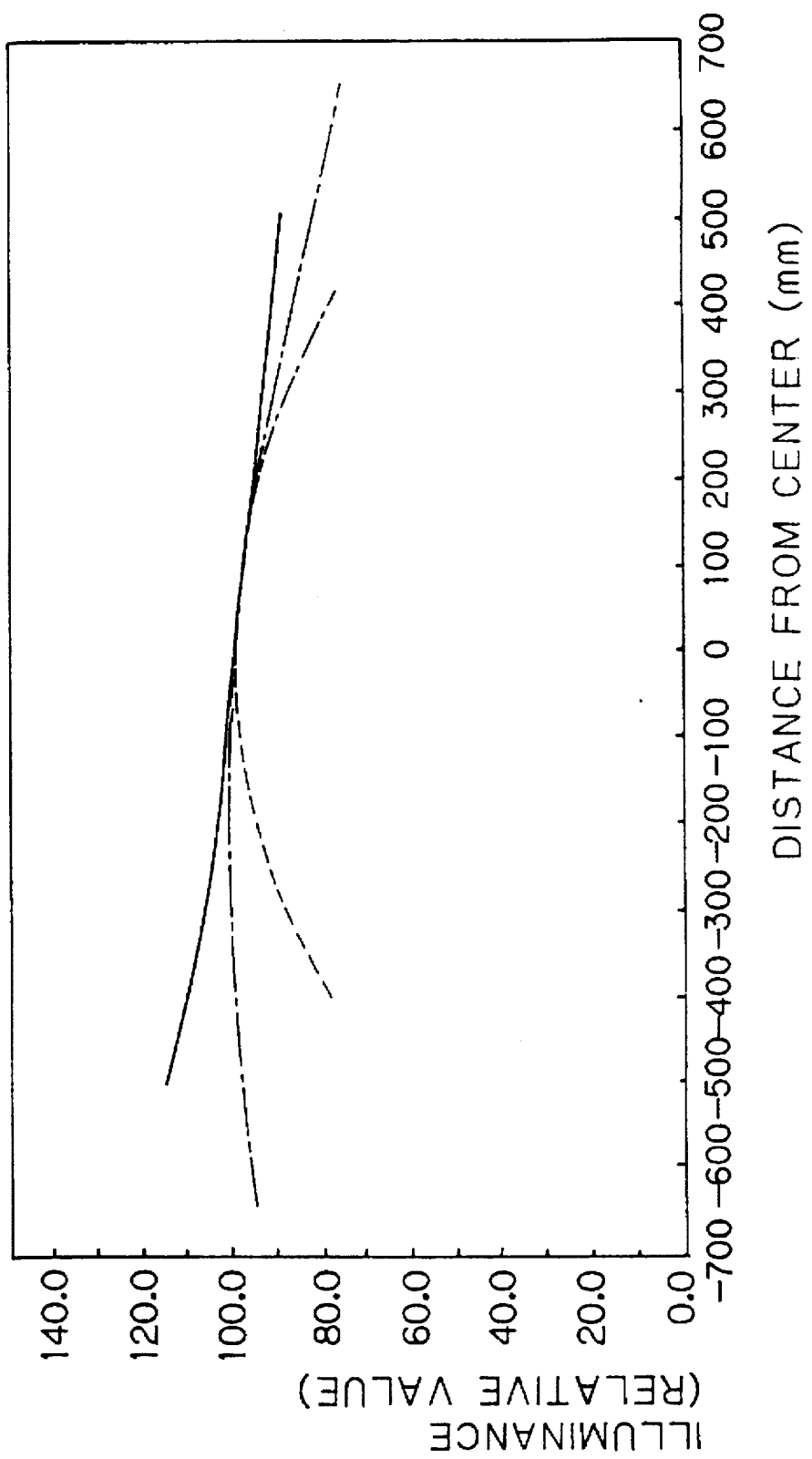
FIG. 5 is a graph of an illuminance distribution at an irradiation surface where a light source unit is not inclined nor displaced.

(a) FIG. 5 shows the illuminance distribution at the irradiation surface 2 where the light source unit 12 is not inclined nor displaced (dθ=0°; dxi=0). In FIG. 5 (and in FIGS. 6 to 8, 10 and 11 as well), the solid line expresses illuminance at the irradiation surface 2 in the displacement direction X from the center of the irradiation surface 2, the dotted line expresses illuminance at the irradiation surface 2 in the direction Y from the center of the irradiation surface 2, and the dotted-and-slashed line expresses illuminance at the irradiation surface 2 in a direction which is at an angle of 38.7° with respect to the displacement direction X (i.e., in a diagonal direction of the irradiation surface 2) from the center of the irradiation surface 2. In FIG. 5, the illuminance is plotted as a relative value where the illuminance at the center of the irradiation surface 2 is 100. As can be seen in FIG. 5, the symmetry of the illuminance in the displacement direction X is largely destroyed (solid line). Further, the symmetry of the illuminance distribution at the irradiation surface 2 as a whole is poor.

Figure 6:
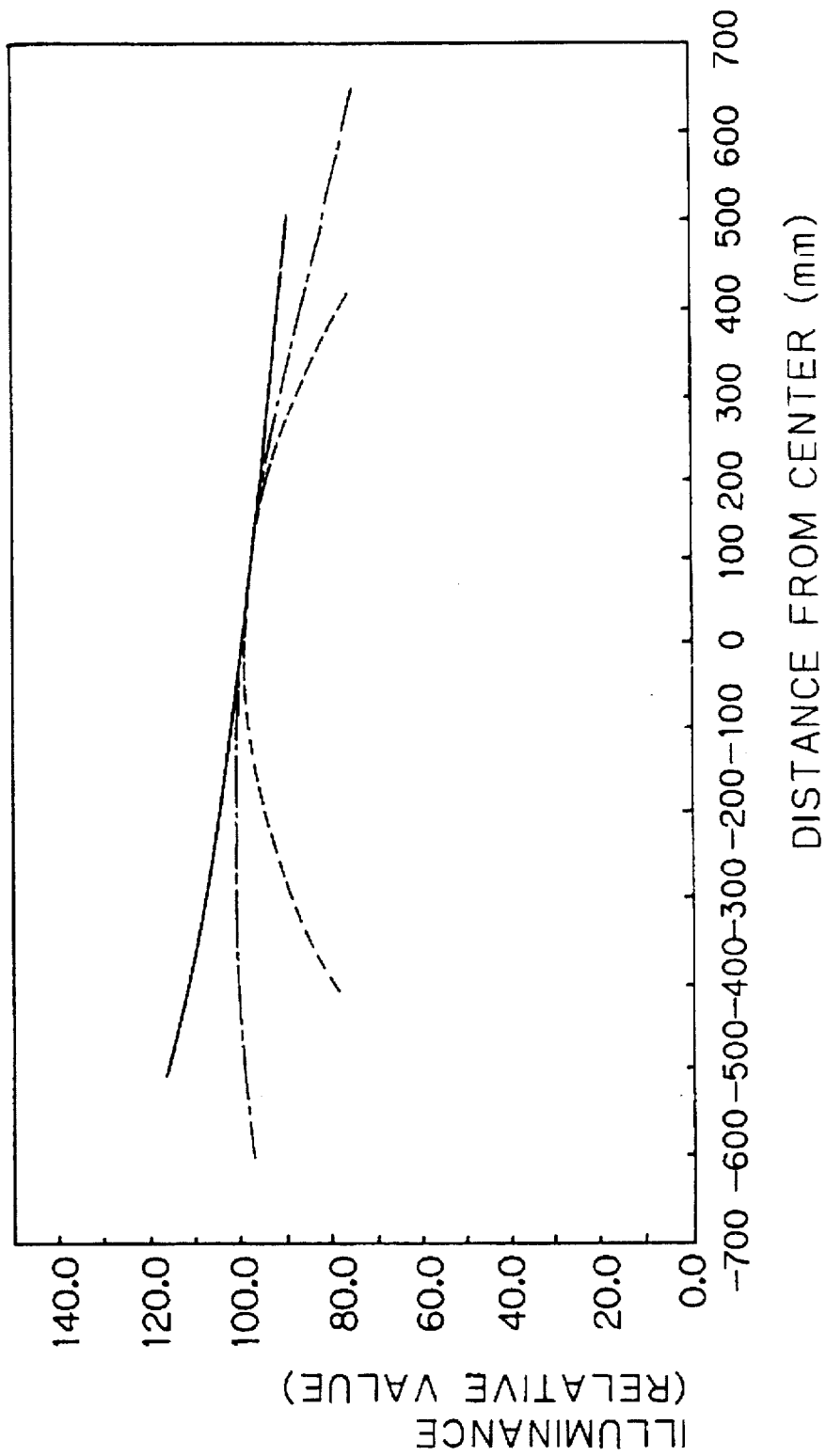
FIG. 6 is a graph of an illuminance distribution at an irradiation surface where the light source unit is displaced in a displacement direction X.

(b) FIG. 6 shows the illuminance distribution at the irradiation surface 2 of where the light source unit 12 is displaced in the displacement direction X by the displacement dxi=45 mm (dθ=0°; dxi=45 mm). The symmetry of the illuminance distribution is not improved merely by displacing the light source unit 12 in the displacement direction X. The illuminance at the irradiation surface 2 is still asymmetrical.

Figure 7:
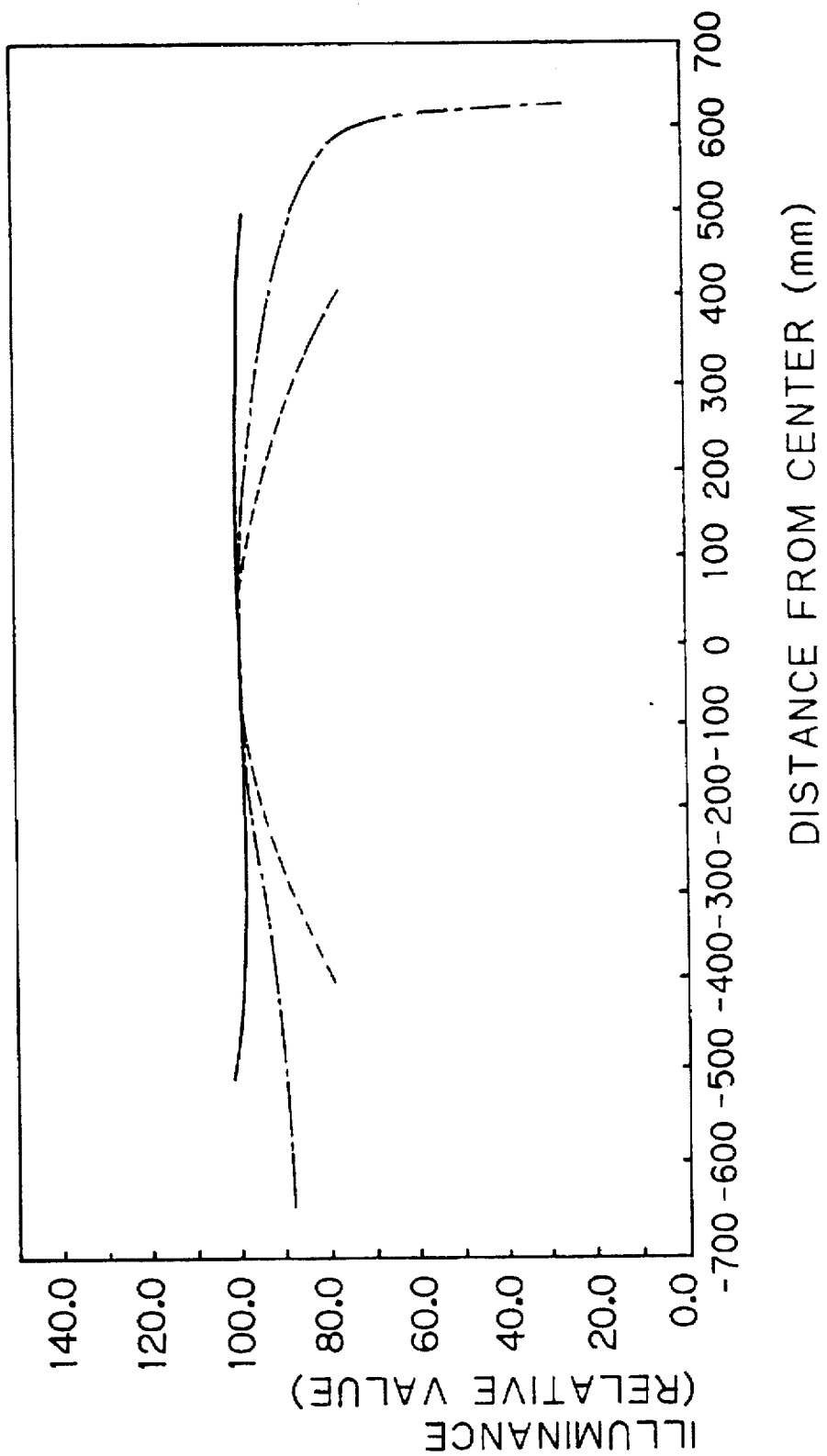
FIG. 7 is a graph of an illuminance distribution at an irradiation surface where the light source unit is not displaced but inclined with respect to a central axis of the irradiation surface.

(c) FIG. 7 shows the illuminance distribution at the irradiation surface 2 of where the light source unit 12 is not displaced but inclined only at an angle of 3.5° with respect to the central axis CA of the irradiation surface 2 (dθ=3.5°; dxi=0). Comparison with FIGS. 5 and 6 clearly shows that the symmetry of the illuminance distribution at the irradiation surface 2 is largely improved when the light source unit 12 is inclined at an angle. In the displacement direction X in particular, the improvement in the symmetry is noteworthy.

Figure 8:
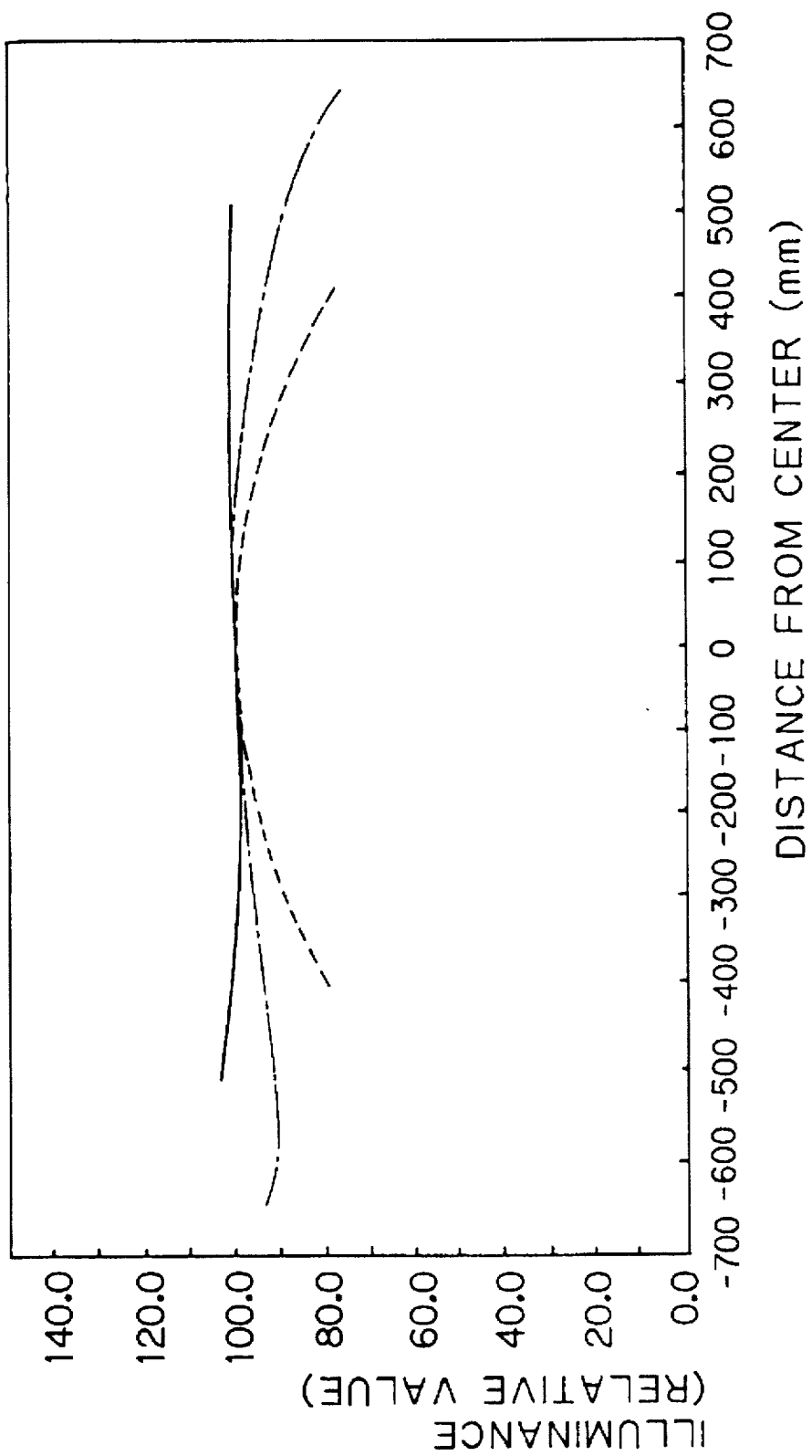
FIG. 8 is a graph of an illuminance distribution at an irradiation surface where the light source unit is displaced and inclined with respect to the central axis of the irradiation surface.

(d) FIG. 8 shows the illuminance distribution at the irradiation surface 2 of where the light source unit 12 is not only inclined at an angle of 3.5° with respect to the central axis CA of the irradiation surface 2 but also displaced 45 mm in the displacement direction X (dθ=3.5°; dxi=45 mm). This is the same as the first preferred embodiment described above. In FIG. 8 like in FIG. 7, the symmetry of the illuminance distribution at the irradiation surface 2 is largely improved. In addition, while the illuminance in the diagonal direction of the irradiation surface 2 drops at an end of the irradiation surface 2 in FIG. 7 (dotted-and-slashed line in FIG. 7), the drop in the illuminance is suppressed in FIG. 8. Thus, the irradiation surface 2 is better illuminated.

As described above, when the light source unit 12 is inclined at an angle with respect to the central axis CA of the irradiation surface 2, the illuminance distribution at the irradiation surface 2 is adjusted to be approximately symmetrical with respect to the central axis CA, whereby the irradiation surface 2 is better irradiated.

Further, by displacing the light source unit 12 in the displacement direction X, the drop in the illuminance at an end of the irradiation surface 2 is suppressed so that the irradiation surface 2 is better illuminated.

Figure 9:
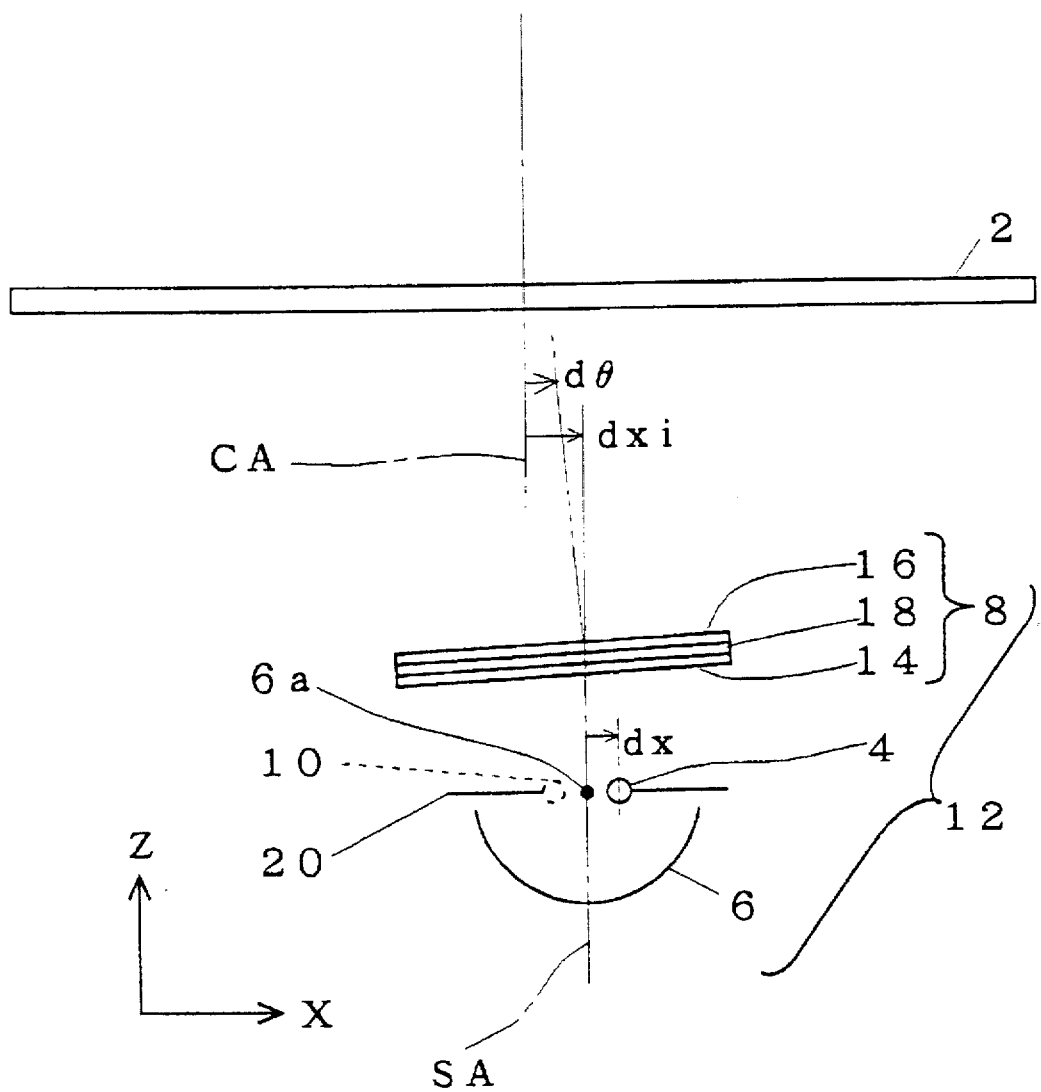
FIG. 9 is a view of an illumination apparatus according to a second preferred embodiment of the present invention.

FIG. 9 is a view of an illumination apparatus according to a second preferred embodiment of the present invention. Unlike the illumination apparatus according to the first preferred embodiment, only the lens 8 is disposed at an angle with respect to the central axis CA of the irradiation surface 2 in the illumination apparatus according to the second preferred embodiment. However, the light source unit 12 formed by the light source 4, the spherical mirror 6 and the lens 8 is displaced as one unit in the displacement direction X by a displacement dxi with the lens 8 inclined at an angle, which is the same as in the first preferred embodiment. The illumination apparatus of the second preferred embodiment is otherwise identical to the illumination apparatus of the first preferred embodiment, and therefore, a redundant description will be simply omitted.

In the second preferred embodiment, the light source image 10 is not formed at the location of the light source 4 since the light source 4 is disposed off the center of curvature 6a of the spherical mirror 6. Hence, the light emitting part of the light source 4 does not block, absorb nor scatter a ray, whereby an effective use of light is maintained. In addition, since the lens 8 is disposed at an angle and the light source unit 12 is disposed at a displaced position, the illuminance distribution at the irradiation surface 2 is adjusted to be approximately symmetrical with respect to the central axis CA, thus better irradiating the irradiation surface 2.

Although the second preferred embodiment requires that not only the lens 8 is inclined at an angle but also the light source unit 12 is displaced in the displacement direction X with the lens 8 inclined, a similar effect is obtained even when the lens 8 is inclined at an angle but the light source unit 12 is not displaced.

Now, to discuss the effect of the illumination apparatus having such a construction as above (namely, the excellent symmetry of the illuminance distribution at the irradiation surface 2), two versions of a specific structure of the illumination apparatus will be described. The first version of structure (a) is where only the lens 8 is disposed inclined at an angle, and the second version of structure (b) is where the lens 8 is inclined at an angle and the light source unit 12 is displaced.

Figure 10:
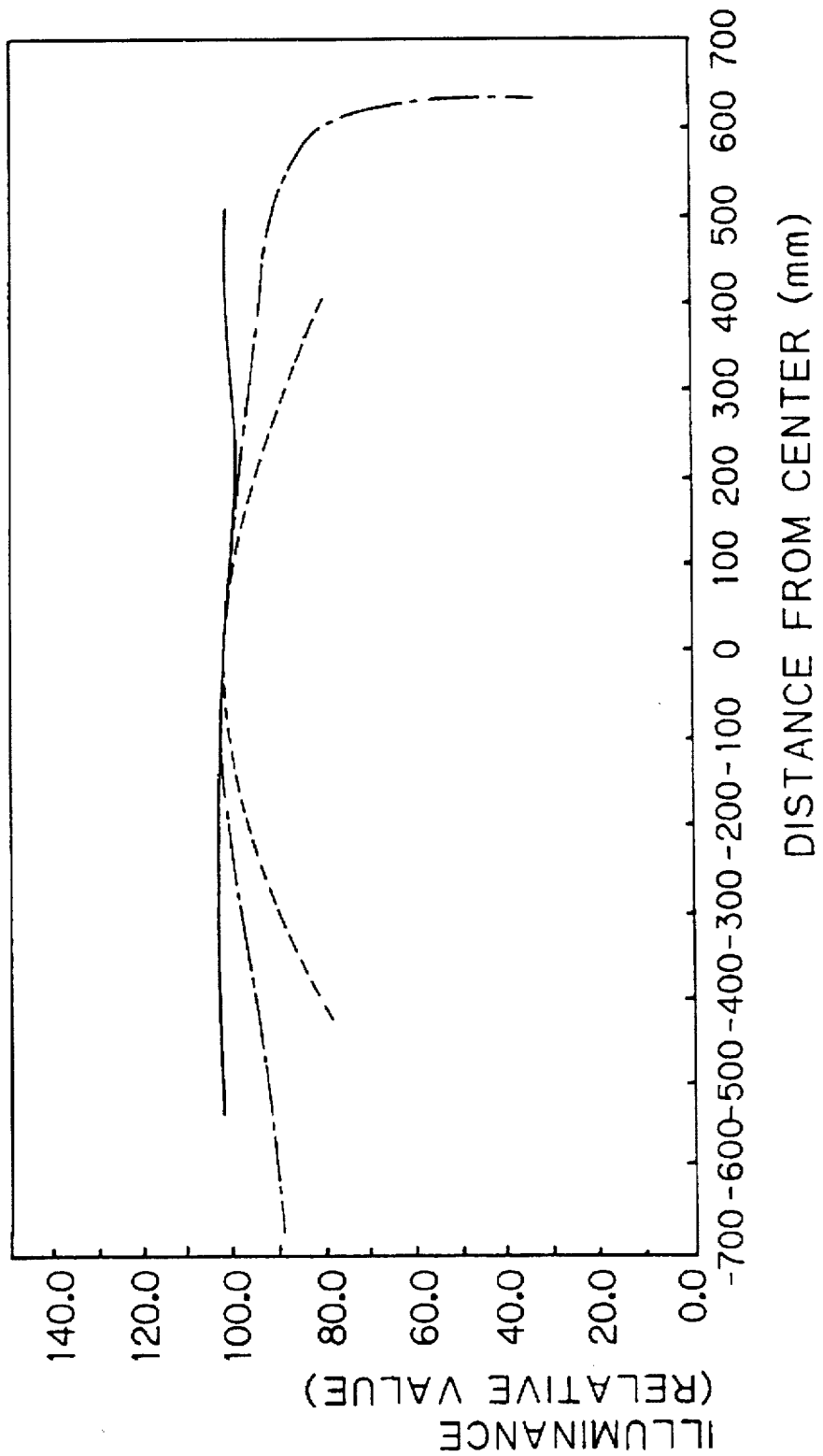
FIG. 10 is a graph of an illuminance distribution at an irradiation surface where the light source unit is not displaced but only a lens is inclined with respect to the central axis of the irradiation surface.

(a) FIG. 10 shows the illuminance distribution at the irradiation surface 2 of where only the lens 8 is inclined at an angle of 3.5° with respect to the central axis CA of the irradiation surface 2 but the light source unit 12 is not displaced (dθ=3.5°; dxi=0). In FIG. 10, merely by disposing the lens 8 inclined, the symmetry of the illuminance distribution at the irradiation surface 2 is largely improved.

Figure 11:
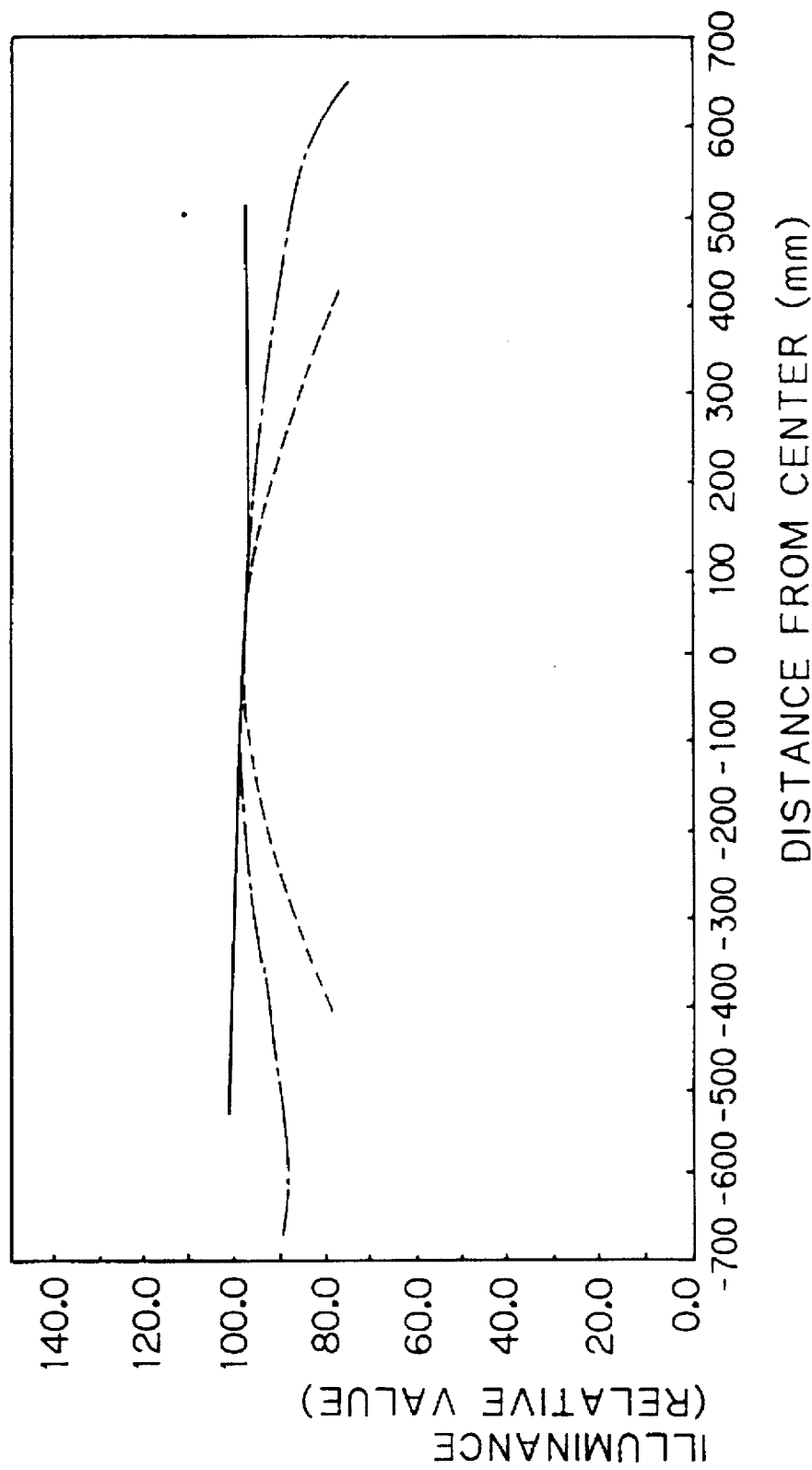
FIG. 11 is a graph of an illuminance distribution at an irradiation surface where not only the lens is inclined with respect to the central axis of the irradiation surface but also the light source unit is displaced with the lens inclined.

(b) FIG. 11 shows the illuminance distribution at the irradiation surface 2 where the lens 8 is inclined at an angle of 3.5° with respect to the central axis CA of the irradiation surface 2 and the light source unit 12 is displaced 45 mm in the displacement direction X with the lens 8 inclined (dθ=3.5°; dxi=45 mm). This is the same as the first preferred embodiment described above. In FIG. 11 like in FIG. 10, the symmetry of the illuminance distribution at the irradiation surface 2 is largely improved. In addition, while the illuminance in the diagonal direction of the irradiation surface 2 drops at an end of the irradiation surface 2 in FIG. 10, the drop in the illuminance is suppressed in FIG. 11. Thus, the irradiation surface 2 is better illuminated.

Although the preferred embodiments above use a cylindrical light source (metal halide lamp) as the light source 4, the light source 4 is not limited to this. Rather, a halogen lamp or a spherical light source may be used as the light source 4. Further, instead of using the light source 4 as described above which is manufactured by enclosing a light emitting part in a cylindrical glass container, a light source which consists only of a light emitting part may be used as the light source 4.

Figure 12:
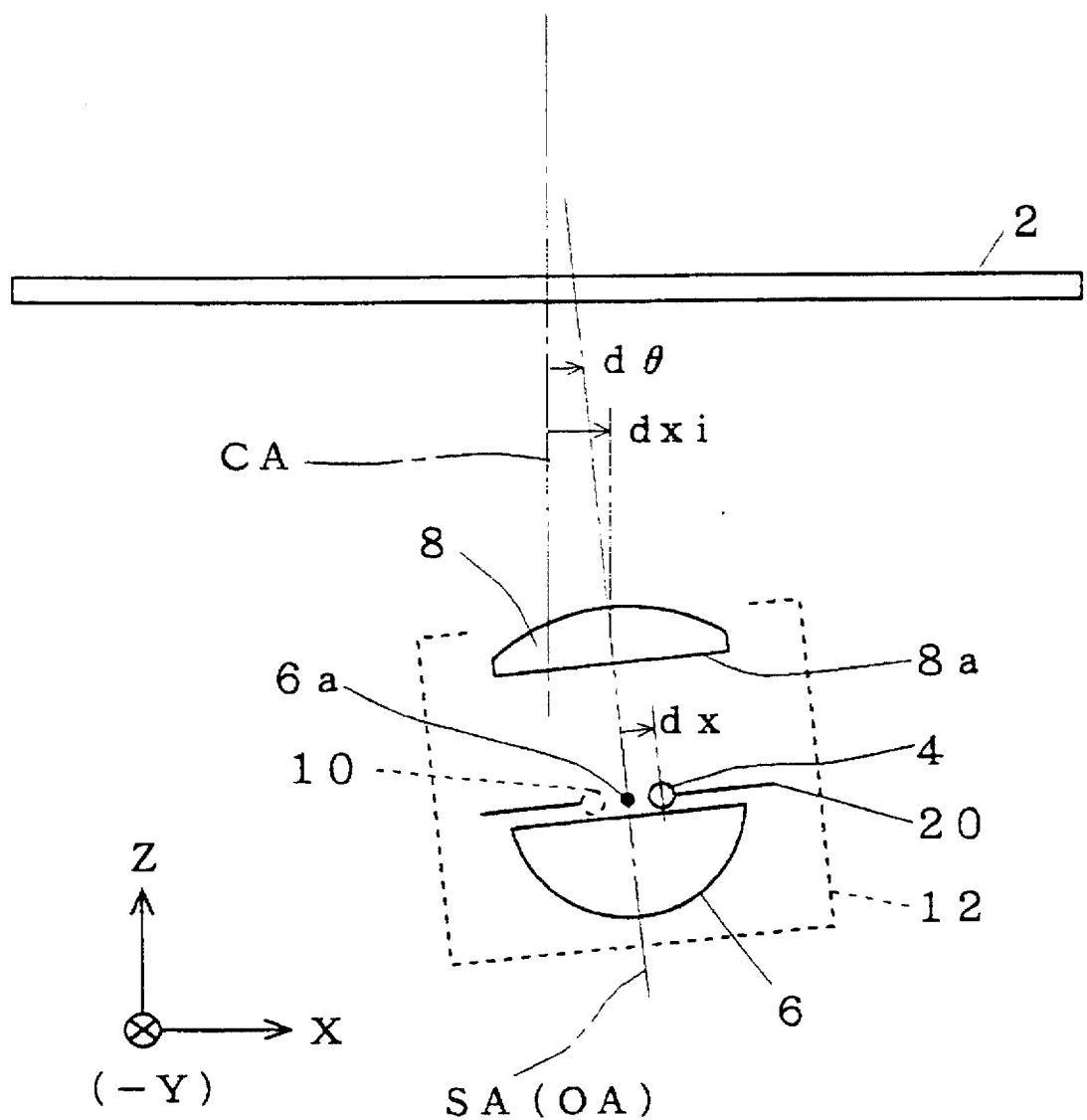
FIG. 12 is a view of an illumination apparatus according to a further preferred embodiment of the present invention.

The structure of the lens 8 is not limited to the above where the lens 8 is formed using a Fresnel lens. Rather, a regular condenser lens commonly used in the field of illumination apparatus may be used as shown in FIG. 12. The glass plates 14 and 16 may be replaced with transparent optical resin plates. The glass plates 14 and 16 are first and second transparent plates which are formed by glass plates or optical resin plates. Where the Fresnel lens 18 is disposed between the first and the second transparent plates of such a material, it is possible to prevent deterioration of the material of the Fresnel lens 18 due to exposure to UV light and protect the surfaces of the lens 18 against scratches. This also protects the Fresnel surfaces from dust.

The foregoing has described the invention in relation to the symmetry of the illuminance distribution at the irradiation surface and the efficiency of illuminating the irradiation surface. The invention is further advantageous when even better illumination is needed at the irradiation surface, particularly when the illumination apparatus is to be used within a contact type printer for plate making, a proximity exposure apparatus for manufacturing a liquid crystal display and etc. Where there is such a need, not only an asymmetric illuminance distribution must be suppressed but also multiple reflection and local concentration of rays must be reduced as described earlier. Now, a detailed description will be given on the mechanism of creation of multiple reflection rays within the illumination apparatus of FIG. 1 and a modification of the illumination apparatus of FIG. 1 which comprises means for preventing multiple reflection rays.

A multiple reflection ray can be created along various patterns of an optical path. Of those patterns of an optical path, the three patterns shown in FIGS. 13A, 13B and 13C adversely affect a contact type printer for plate making, a proximity exposure apparatus for manufacturing a liquid crystal display and etc.

Figure 13A:
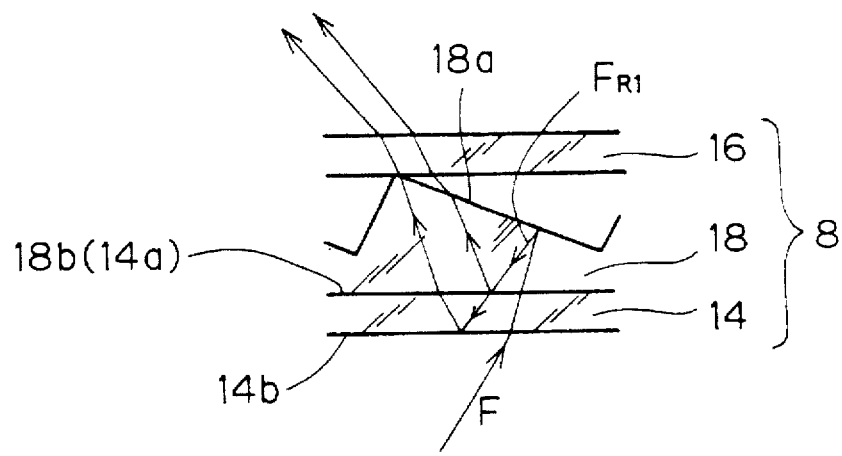
FIGS. 13A, 13B and 13C are views of an optical path of a multiple reflection ray within a lens.
Figure 13B:
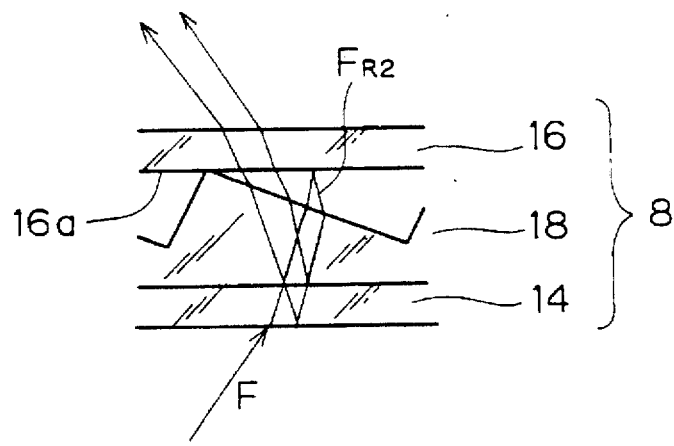
Figure 13C:
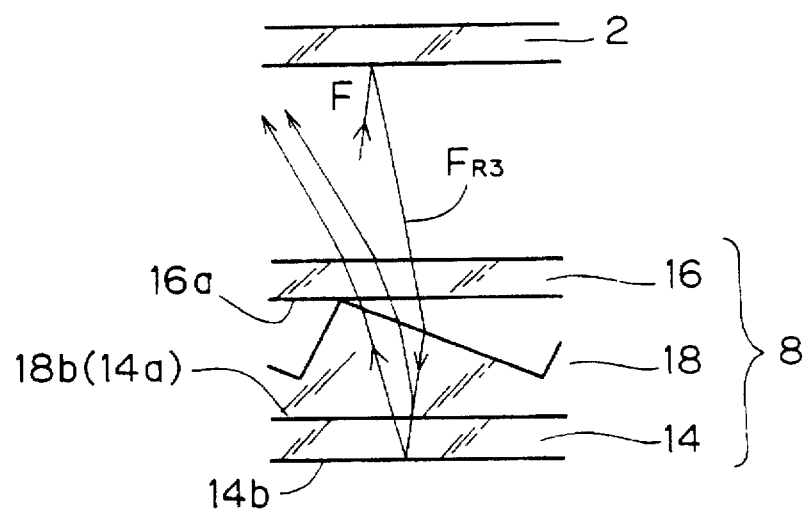

In the first pattern (FIG. 13A), a portion of a ray F impinging on the Fresnel lens 18 from the glass plate 14 side is reflected by a lens surface 18a toward a flat surface 18b of the Fresnel lens 18 as a reflection ray FR1. The reflection ray FR1 is partially reflected by the flat surface 18b and partially reflected by a top surface 14a of the glass plate 14 (FIG. 13A shows both a reflection ray from the flat surface 18b and a reflection ray from the glass plate 14 with the same line.), and resulting reflection rays exit the lens 8 through the Fresnel lens 18 and the glass plate 16 toward the irradiation surface 2 as multiple reflection rays. A ray passing through the flat surface 18b and the top surface 14a is reflected by a bottom surface 14b of the glass plate 14 and exits the lens 8 through the glass plate 14, the Fresnel lens 18 and the glass plate 16 toward the irradiation surface 2 as a multiple reflection ray.

In the second pattern (FIG. 13B), a ray F from the Fresnel lens 18 toward the glass plate 16 is partially reflected by a bottom surface 16a of the glass plate 16, and a resulting reflection ray FR2 is guided into the Fresnel lens 18 again. The reflection ray FR2 is then reflected respectively by the flat surfaces 18b, 14a and 14b to become multiple reflection rays which impinges upon the irradiation surface 2 as in the first pattern. Although not shown in FIG. 13B, a ray reflected by a top surface 16b of the glass plate 16 also travels a similar optical path to exit the lens 8 toward the irradiation surface 2.

In the third pattern (FIG. 13C), a ray F irradiated upon the irradiation surface 2 through the lens 8 is partially reflected by the irradiation surface 2, and a resulting reflection ray FR3 returns to the Fresnel lens 18 through the glass plate 16. The reflection ray FR3 is then reflected respectively by the flat surfaces 18b, 14a and 14b to become multiple reflection rays which impinges upon the irradiation surface 2 as in the first and the second patterns.

From the analysis above of optical paths of multiple reflection rays, it is understood that a reduction in reflection indexes at the reflection surfaces and a reduction of the sizes of the reflection surfaces are effective means for suppressing multiple reflection rays. Hence, if modified to further comprise the following additional structure, the illumination apparatus of FIGS. 1, 9 and 12 reduce multiple reflection rays.

More particularly, the additional structure requires forming the glass plate 14 as a plate of non-glare glass which has an optically diffuse surface, aiming at diffusing reflection rays at the flat surfaces 14a and 14b of the glass plate 14 and thereby reducing local concentration of multiple reflection rays. Anti-reflection films may be formed over the flat surface 18b of the Fresnel lens 18 and the flat surfaces 16a and 16b of the glass plate 16. Where the lens 8 is formed by a common condenser lens (FIG. 12) and therefore multiple reflection is created within the condenser lens (Optical paths of multiple reflection will not be described here.), the lens surfaces of the condenser lens 8 may be coated with anti-reflection films. Further, where unwanted multiple reflection affecting the irradiation surface 2 is created only locally at a partial surface area of the lens 8, the partial surface area may be coated with an anti-reflection film. The point of the additional structure is to dispose anti-reflection film surfaces completely or partially coated with anti-reflection films in an optical path along which a ray enters and exits the lens 8 regardless of the structure of the lens 8. With such an additional structure, multiple reflection rays are reduced.

As described earlier, the lens 8 is formed by sandwiching the Fresnel lens 18 by the two glass plates (the first and the second transparent plate) 14 and 16 in the illumination apparatuses of FIGS. 1 and 9. To manufacture the lens 8 having such a structure, the Fresnel lens 18 and the glass plate 14 which is to be disposed on the light source 4 side of the Fresnel lens 18 are optically bonded to each other with an adhesive or by filling a liquid (such as a fluid paraffin) between the Fresnel lens 18 and the glass plate 14. Since this optical bonding of the Fresnel lens 18 and the glass plate 14 eliminates the reflection surfaces 18b and 14a as a matter of fact, the lens 8 includes less reflection surfaces. As a result, creation of multiple reflection rays is suppressed.

Figure 14A:
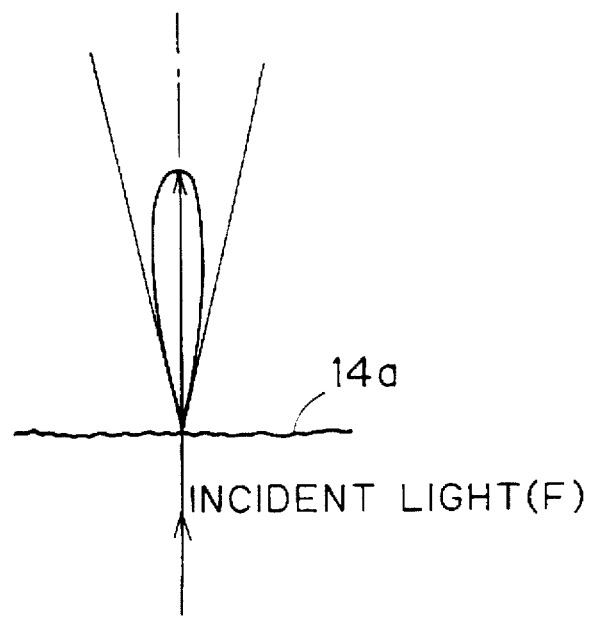
FIGS. 14A and 14B are views showing a diffuse characteristic of an optical diffuse surface.
Figure 14B:
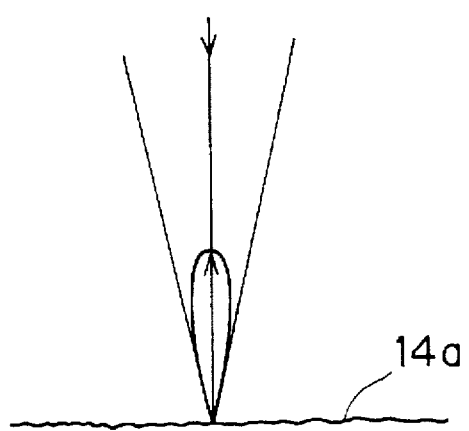
Figure 18A:
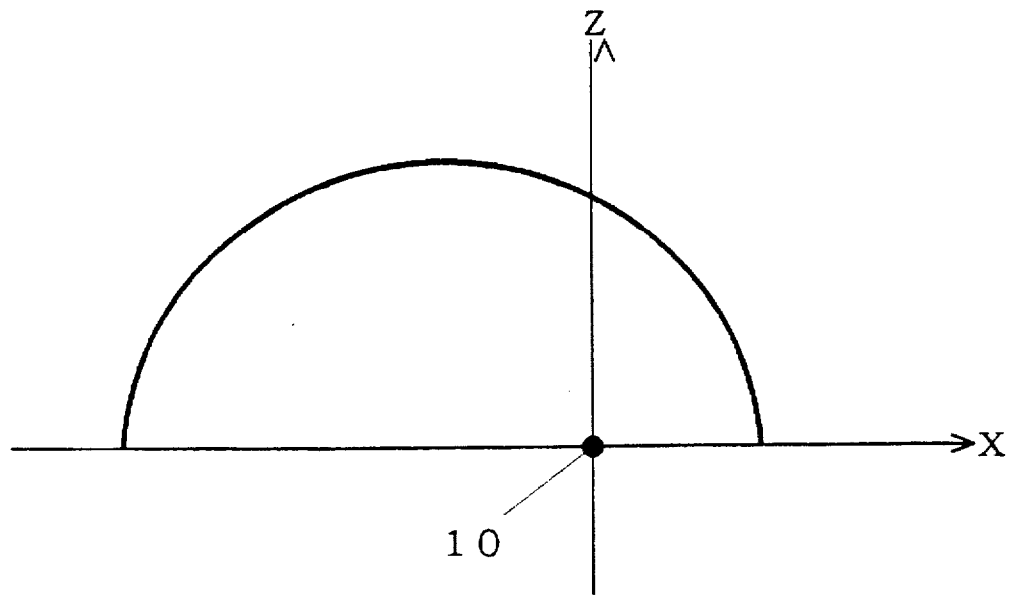
FIG. 18 is a view showing luminous intensity distribution characteristics of a light source and a light source image.
Figure 18B:
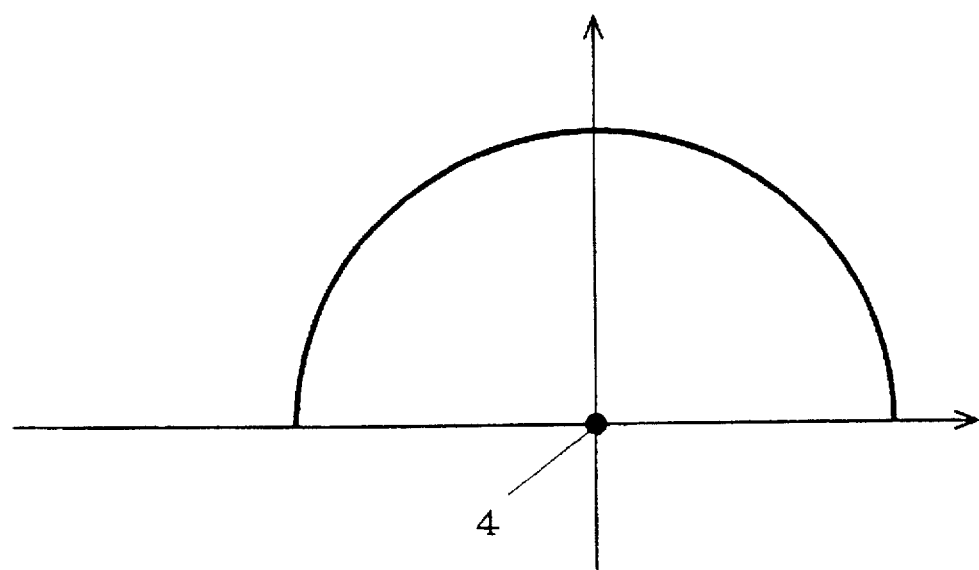
Figure 15:
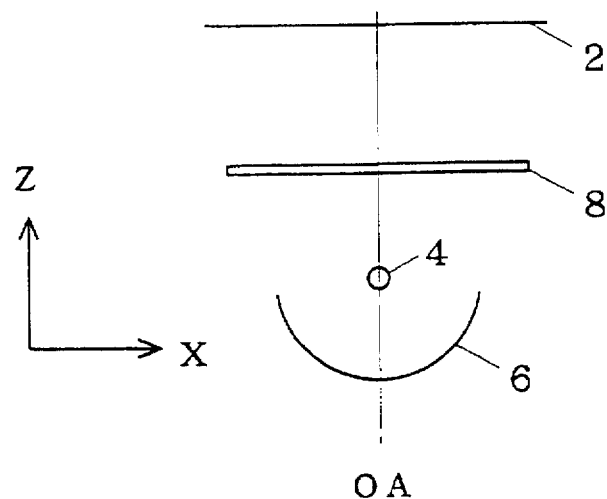
FIGS. 15 and 16 are schematic cross sectional views of a conventional illumination apparatus.

Instead of suppressing multiple reflection rays by decreasing reflection indexes at the reflection surfaces and reducing the number of the reflection surfaces in the modification above, the surface 14a of the glass plate 14, for example, may be formed as an optical diffuse surface so as to lessen local concentration of multiple reflection rays and enhance the uniformity of the illuminance distribution at the irradiation surface 2. The surface 14a of the glass plate 14 may be buffed, for instance, to finish the surface 14a as optical diffuse surface. Buffing forms an optical diffuse surface which has coarseness of one to point few microns. The optical diffuse surface 14a formed in such a manner exhibits a diffuse characteristic as that shown in FIGS. 14A and 14B. Of FIGS. 14A and 14B showing a distribution of the intensity of light impinging upon the diffuse surface from an incident angle, FIG. 14A expresses a diffuse characteristic with respect to transmitted light while FIG. 14B expresses a diffuse characteristic with respect to reflection light. In this modification, a ray F impinging upon the optical diffuse surface from the light source 4 is diffused in an angular range of ± few degrees from the incident angle (FIG. 14A), while the reflection rays FR1 to FR3, when reflected again at the optical diffuse surface 14a, are each diffused at an azimuth of up to ± few degrees from the incident angle (FIG. 14B). Thus, the reflection rays FR1 to FR3 are diffused in a certain angular range. Hence, local concentration of multiple reflection rays is reduced and the adverse effect of the multiple reflection rays is suppressed.

Although the modification above which requires to form only the surface 14a of the glass plate 14 as an optical diffuse surface, the both surfaces of the glass plate 14 may be optical diffuse surfaces. Further, one surface or the both surfaces of the glass plate 16 as well may be formed as optical diffuse surfaces. The flat surface 18b of the Fresnel lens 18 may also be an optical diffuse surface. Where unwanted multiple reflection affecting the irradiation surface 2 is created only locally at a partial surface area of the lens 8, an optical diffuse area may be necessary only over the partial surface area at which the unwanted multiple reflection is created rather than over the entire surface area of the lens 8. In other words, when optical diffuse surfaces completely or partially coated with optical diffuse areas are disposed in an optical path along which a ray enters and exits the lens 8, local concentration of multiple reflection rays is reduced.

Where the illumination apparatus includes the lens 8 which is formed by the Fresnel 18 and the two glass plates 14 and 16 (FIGS. 1 and 9), the illumination apparatus may include combination of the anti-reflection film surfaces and the optical bonding or the optical diffuse surfaces. For instance, the irradiation surface 2 is more effectively protected against the adverse effect of the multiple reflection rays by forming an anti-reflection film on the free surface 14b of the glass plate 14 or alternatively by forming the surface 14b as an optical diffuse surface in addition to optically bonding the glass plate 14 and the Fresnel lens 18 to each other.

While the invention has been described in detail, the foregoing description is in all aspects illustrative and not restrictive. It is understood that numerous other modifications and variations can be devised without departing from the scope of the invention.

We claim:

1. An illumination apparatus for illuminating an irradiation surface which has a central axis, comprising:

a light source having front and rear half portions, said light source emitting rays from said front and rear half portions;

a spherical mirror disposed to face said rear half portion of said light source for reflecting said rays from said rear half portion, said spherical mirror having an axis of symmetry and a center of curvature; and a lens system disposed to face said front half portion of said light source for directing said rays from said front half portion and reflected rays from said spherical mirror to said irradiation surface, wherein said light source is displaced from said center of curvature of said spherical mirror in a displacement plane, said displacement plane including said axis of symmetry of said spherical mirror, and wherein said lens system is inclined at an angle with respect to said central axis of said irradiation surface in said displacement plane, said light source, said spherical mirror and said lens system are displaced as one unit from said central axis of said irradiation surface in said displacement plane.

2. The illumination apparatus of claim 1, wherein said light source comprises a light emitting means for emitting rays and a glass container for enclosing said light emitting means, and wherein the glass container is one of cylindrical and spherical and has a radius;

said light source being displaced from said center of curvature of said spherical mirror by a distance larger than half the radius of said glass container.

3. The illumination apparatus of claim 2, wherein said light source, said spherical mirror and said lens system are inclined as one unit at an angle with respect to said central axis of said irradiation surface.

4. The illumination apparatus of claim 2, wherein the lens system is provided with a reflection control device for controlling reflection of said rays in said lens system.

5. The illumination apparatus of claim 4, wherein said reflection control device comprises an anti-reflection film on at least one surface of said lens system.

6. The illumination apparatus of claim 4, said lens system comprising:

a Fresnel lens having a Fresnel surface and a flat surface, said flat surface being directed toward said light source and defining a light source side of said Fresnel lens, the Fresnel surface defining an irradiation surface side of the Fresnel lens;

a first transparent plate disposed on the light source side of said Fresnel lens; and a second transparent plate disposed on the irradiation surface side of said Fresnel lens, and wherein said first transparent plate and said Fresnel lens are in optically tight contact to each other.

7. The illumination apparatus of claim 6, wherein said reflection control device comprises an optically diffuse surface on a surface of said-lens system.

8. The illumination apparatus of claim 7, wherein the optically diffuse surface comprises a surface of said first transparent plate.

9. The illumination apparatus of claim 1, wherein said light source, said spherical mirror and said lens system are inclined as one unit at an angle with respect to said central axis of said irradiation surface.

10. The illumination apparatus of claim 1, wherein the lens system comprises a condenser lens.

* * * * *